(12) United States Patent
Hunt (10) Patent No.: US 9,930,865 B1
(45) Date of Patent: Apr. 3, 2018

(54) PET FOOD BOWL

(71) Applicant: Robin A. Hunt, Vivian, LA (US)

(72) Inventor: Robin A. Hunt, Vivian, LA (US)

( * ) Notice: Subject to any disclaimer, the term of this patent is extended or adjusted under 35 U.S.C. 154(b) by 186 days.

(21) Appl. No.: 15/011,943

(22) Filed: Feb. 1, 2016

Related U.S. Application Data

(60) Provisional application No. 62/111,307, filed on Feb. 3, 2015.

(51) Int. Cl.
*A01K 5/01* (2006.01)

(52) U.S. Cl.
CPC .................................. *A01K 5/0114* (2013.01)

(58) Field of Classification Search
CPC .......... A01K 5/01; A01K 5/0114; A01K 5/00; A24F 19/0071
See application file for complete search history.

(56) References Cited

U.S. PATENT DOCUMENTS

| | | | | |
|---|---|---|---|---|
| 1,653,897 | A | * | 12/1927 | Farr .................... A24F 19/0071 131/241 |
| 2,142,647 | A | * | 1/1939 | Heller ................. A24F 19/0071 131/241 |
| 6,401,962 | B1 | | 6/2002 | Littlejohn et al. |
| D468,590 | S | | 1/2003 | Jalet et al. |
| D476,530 | S | | 7/2003 | Jalet et al. |
| D607,616 | S | | 1/2010 | Newsome et al. |
| 7,722,049 | B2 | | 5/2010 | Williams et al. |
| D670,451 | S | | 11/2012 | Able |
| D705,500 | S | | 5/2014 | Gambino |
| 8,800,493 | B2 | * | 8/2014 | Harding ............... A01K 5/0142 119/61.57 |
| 9,089,112 | B2 | * | 7/2015 | Binothman .......... A01K 5/0114 |
| 2002/0096528 | A1 | | 7/2002 | Fernandez |
| 2008/0067180 | A1 | | 3/2008 | Schanche |
| 2010/0175635 | A1 | * | 7/2010 | Martinez ................ A01K 31/12 119/713 |
| 2014/0183105 | A1 | | 7/2014 | Wagenen et al. |
| 2015/0068460 | A1 | * | 3/2015 | Jones ................... A01K 5/0114 119/51.01 |

FOREIGN PATENT DOCUMENTS

| | | | | | |
|---|---|---|---|---|---|
| GB | | 958584 | A * | 5/1964 | ......... A24F 19/0071 |
| GB | | 1344267 | A * | 1/1974 | .......... A01K 5/0114 |

* cited by examiner

*Primary Examiner* — Kristen C Hayes
(74) *Attorney, Agent, or Firm* — Aaron R. Cramer; Cramer Patent & Design, PLLC.

(57) ABSTRACT

A height adjustable pet food bowl is capable of being secured to a flat surface by means of a suction cup contained within a base portion. The pet food bowl is positioned at a tilted orientation for easier feeding by the pet. The bowl utilizes volumetric graduations displayed on an inner surface. In an exemplary embodiment, measurements are denoted in increments of cups.

14 Claims, 8 Drawing Sheets

PET FOOD BOWL

RELATED APPLICATIONS

This application claims the benefit of U.S. Provisional Application No. 62/111,307, which was filed Feb. 3, 2015, the entire disclosures of which are incorporated herein by reference.

FIELD OF THE INVENTION

The present invention relates generally to a pet food bowl capable of being secured to a flat surface and providing features enabling reducing to eliminating the risk of choking during feeding.

BACKGROUND OF THE INVENTION

Keeping pets is a time-consuming task, requiring one to constantly feed, groom, and clean up after their animal friends. A hardship endured by owners of pets is to keep their food and water dishes from becoming toppled over. Another hardship is to ensure that the food and water dishes do not provide such an angle that makes eating and drinking deleterious to the animal's health.

Choking and gagging are some of the hazards associated with such food and water dishes which are difficult for an animal to access properly. It is also a benefit to provide a pet food bowl that can be adjustable in height to account for a growing animal or if a single bowl is to be used with animals of different sizes. The use of the pet food bowl provides pet owners a method of ensuring that food and water bowls do not become toppled or disturbed while providing safe and easy access for such animals during feeding in a manner that is quick, easy, and effective.

SUMMARY OF THE INVENTION

The inventor has recognized the aforementioned inherent problems and lack in the art and observed that there is a need for a pet food bowl capable of being secured to a flat surface and providing features enabling reducing to eliminating the risk of choking during feeding.

It is therefore the purpose of the inventor to provide a pet feeding apparatus which comprises a bowl which has an integrally molded first latching feature located on an exterior bottom side of the bowl, a post which protrudes downward from an integrally molded second latching feature, a housing which has a receiving tube upwardly projecting from the center of the housing and a means for height adjustment by removably attaching and vertically adjusting the bowl in a position relative to the housing. The bowl is capable of being either secured, or in other embodiments, removably secured, to the post when the first and second latching features are connected. The bowl is also removably secured to the post while the post may be removably positioned within the receiving tube. The housing is capable of being securely attached to a horizontal surface. The bowl is also capable of being moved at an angle. The angle of movement is relative to a vertical center axis of the means of height adjustment.

The bowl may also comprise an integrally-molded curb feature which protrudes perpendicularly from an inner surface and extending partially along a top edge of the bowl. Additionally, the bowl may also have a plurality of graduations positioned along the inner surface. The graduations may display volumetric indicia.

The housing of the device may further comprise an internal suction cup having a perimeter affixed to a bottom perimeter of the housing, an actuator handle located on a side surface of the housing which is in mechanical communication with an actuator rod which passes through the side surface of the housing and an eyelet secured to a center portion of the suction cup and in mechanical communication with the actuator rod. Turning the actuator handle in turn actuates the actuator rod, thereby lifting or lowering the suction cup. When the suction cup is raised or lowered an internal vacuum against a horizontal surface is either created or broken.

The height adjustment means may comprise a spring pin and the receiving tube which has a plurality of apertures. The spring pin correspondingly engages within an individually aligned aperture. The first latching feature may be "T"-shaped and the second latching feature may have a pair of corresponding "L"-shaped fingers which permit sliding engagement into each other. The first latching feature may be positioned in an off-center location relative to a center axis of the bowl, thereby presenting the bowl in a tilted state. Both the bowl and the housing may be made by injection molding using machine-washable plastic.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 specialized pet food bowl
20 bowl 22 curb feature
23 bowl cavity
24 male latching feature
30 graduation
60 base assembly
62 housing
63 post
64 receiver tube
65 spring pin
66 aperture
68 female latching feature
70 finger
80 suction cup
82 actuator handle
84 actuator rod
86 eyelet
100 pet food
110 flat surface

DETAILED DESCRIPTION OF THE PREFERRED EMBODIMENT

The best mode for carrying out the invention is presented in terms of its preferred embodiment, herein depicted within a preferred embodiment FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a pet food bowl (herein described as the "apparatus") 10, being removably attached to a base assembly 60 which is in turn secured to a floor surface 110 via a large suction cup.

Referring now to FIGS. 1-5 and 7-9 perspective, front, back, left, right, top, bottom and sectional views of the apparatus 10, according to the preferred embodiment of the present invention, are disclosed. The apparatus 10 provides a means of positioning a large-diameter concave pet food bowl 20 at a desired height so as to allow easy access to contained pet food 100 within the bowl 20 by a pet. The apparatus 10 also provides positioning of the bowl 20 at an angle to provide gravitational positioning of the pet food 100 toward a lowered front edge portion. The shape and selective positioning of the bowl 20 is envisioned to be especially helpful to pets having special physical needs and limitations such as elderly dogs, arthritic dogs, dogs having short snouts and/or short tongues, and the like.

Figure 6A:
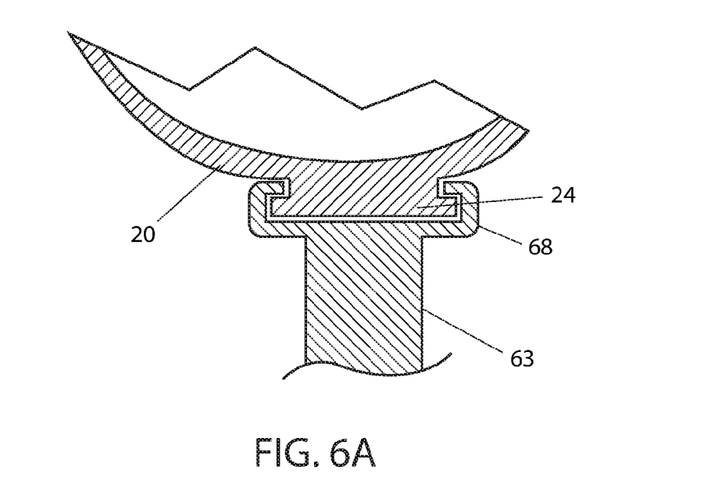
FIG. 6A is a sectional view of a latching feature 24 of the specialized pet food bowl 10 taken along section line B-B (see FIG. 5), according to a preferred embodiment of the present invention.
Figure 6B:
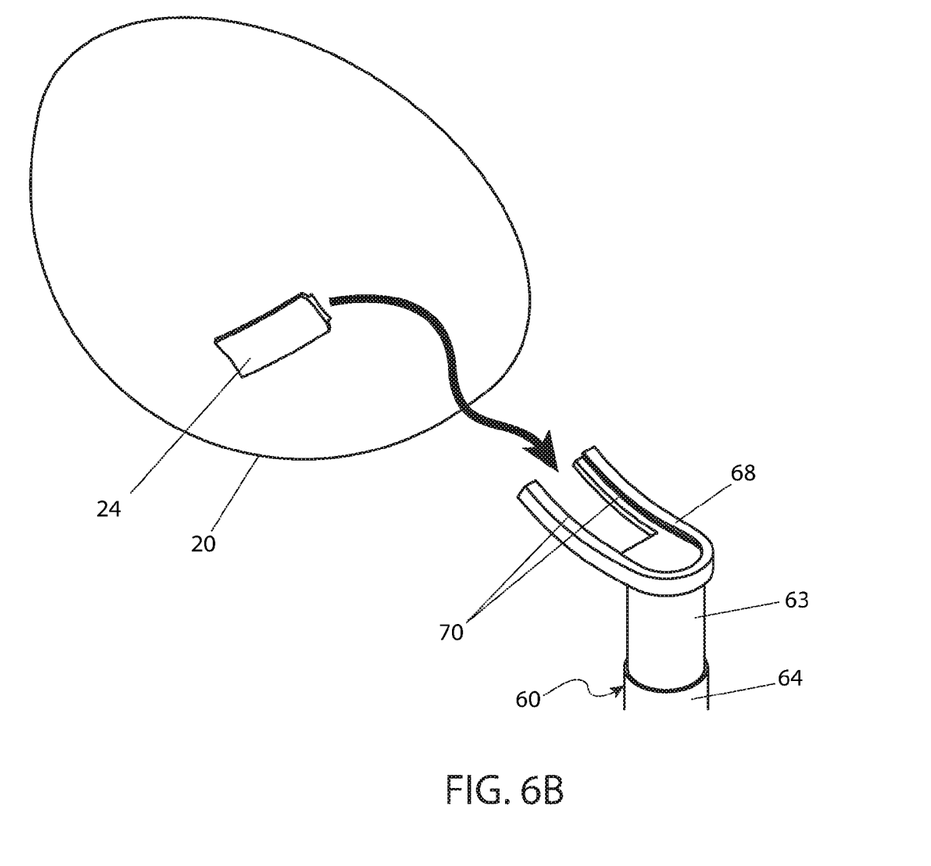
FIG. 6B is an exploded view of bowl 20 and base assembly 60 portions of the specialized pet food bowl 10 depicting engagement thereof, according to a preferred embodiment of the present invention.
Figure 7:
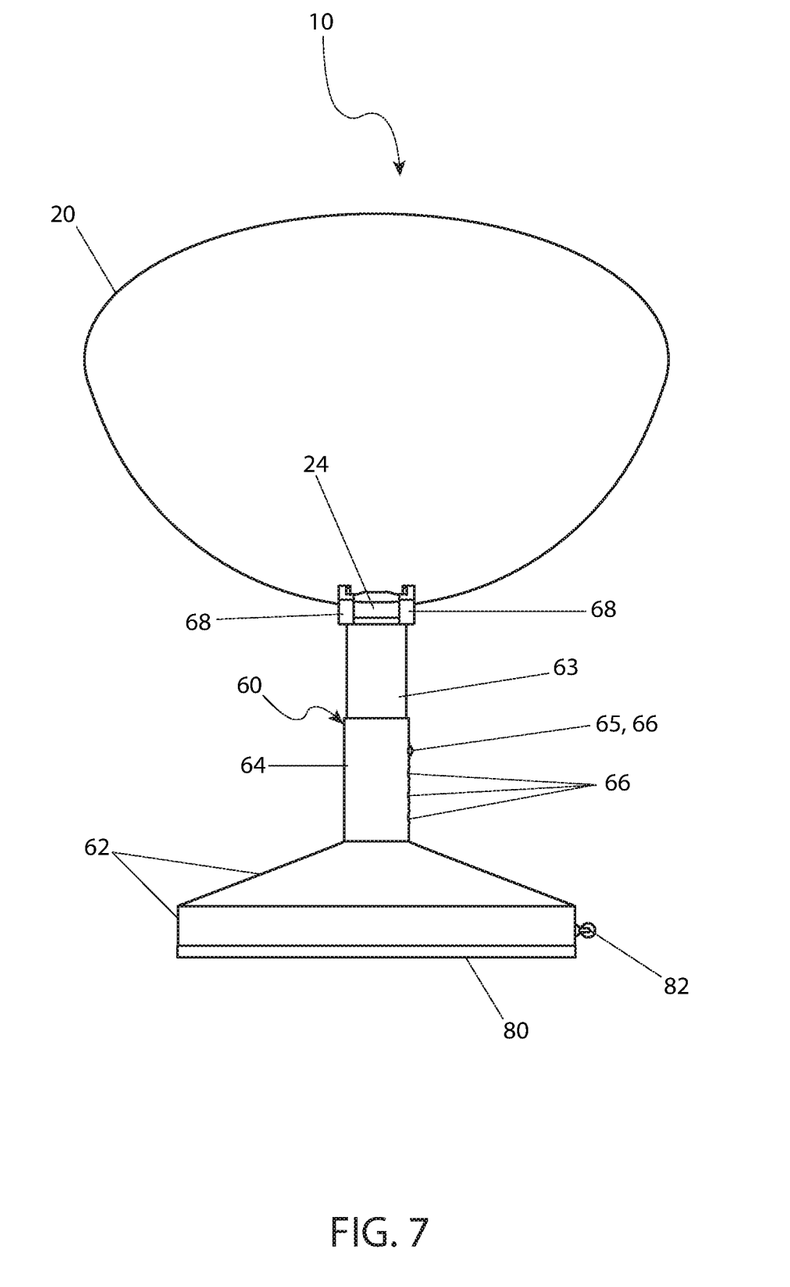
FIG. 7 is a back side elevation view of a specialized pet food bowl 10, according to a preferred embodiment of the present invention.
Figure 8:
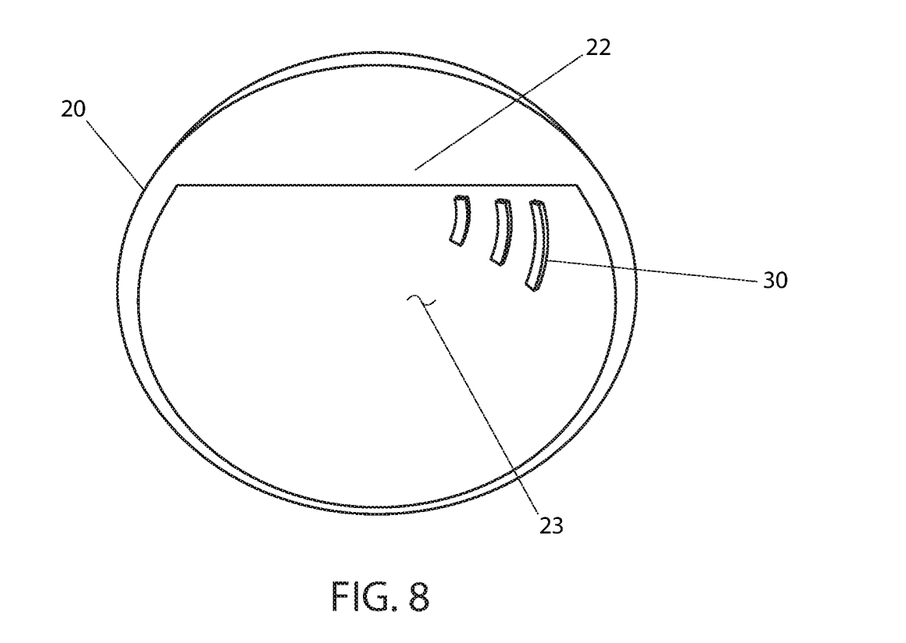
FIG. 8 is a top side plan view of a specialized pet food bowl 10, according to a preferred embodiment of the present invention; and, FIG. 9 is a bottom side plan view of a specialized pet food bowl 10, according to a preferred embodiment of the present invention.
Figure 9:
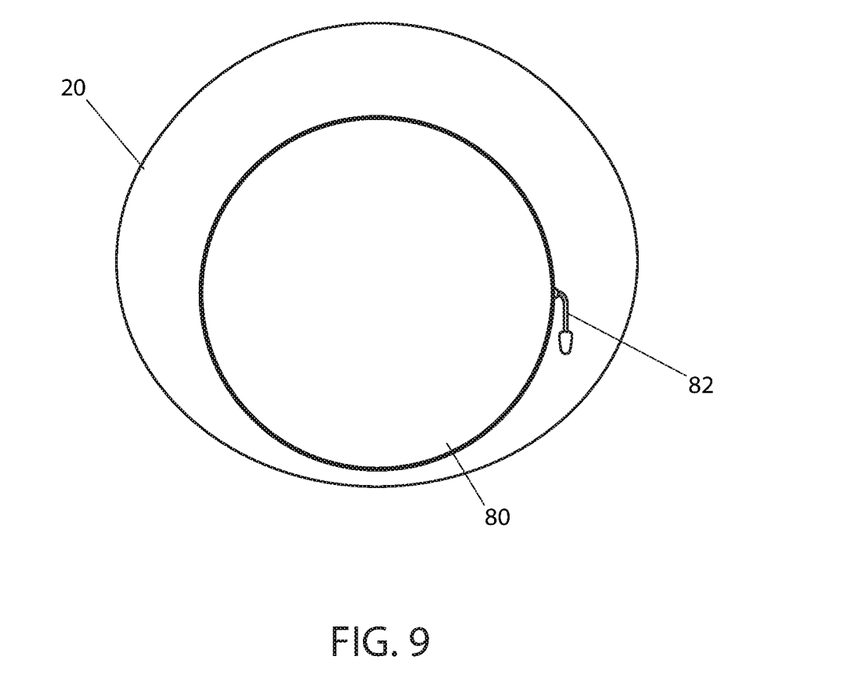

The bowl portion 20 of the apparatus 10 includes an integral male latching feature 24 which provides removable attachment to a subjacent base assembly 60 via engagement into a mating female latching feature 68 of the base assembly 60 (see also FIGS. 6A and 6B). The male latching feature 24 of the bowl 20 is positioned in an off-center location along a bottom surface portion of the bowl 20 so as to present the bowl 20 in a tilted state, thereby presenting a lowered rim portion of the bowl 20 to the pet.

The base assembly 60 provides a foundational function to the apparatus 10 having integrally-molded portions including a conical or cylindrical housing 62, an upwardly extending receiver tube 64, and an internal suction cup 80. Together with a telescoping inserted post 63, the base assembly 60 provides the height adjusting function. The base assembly 60 also includes a large internal suction cup 80 which occupies a bottom surface of the housing 62 to provide a means to secure the apparatus 10 to a subjacent flat surface 110 such as a floor.

The base assembly 60 includes cylindrical and telescoping portions including a post 63 and a receiver tube 64 which provide a means to adjust the height at which the bowl 20 is positioned above the flat surface 110. The post 63 is an integrally-molded portion of the aforementioned female latching feature 68, and protrudes in a downward direction therefrom, where it is slidingly inserted into a top open end portion of the receiver tube 64. The post 63 may be selectively positioned within the receiver tube 64 to secure the bowl 20 at a desired height based upon a size of the pet and other pet characteristics. The position of the post 63 may then be secured within the receiver tube 64 via at least one (1) spring pin 65 located within the post 63, and a plurality of correspondingly positioned apertures 66 which are arranged in a vertical row along a side surface of the receiver tube 64. The spring pin 65 includes a protruding oval-head portion which engages an aligned aperture portion 66 of the receiver tube 64, thereby securing the height of the post 63 and the attached bowl 20. To adjust the height of the bowl 20, a user presses upon the spring pin 65 to release the post 63 from the receiver tube 64; adjusts the position of the post 63; and, reengages the spring pin 65 into an aligned aperture 66.

The base assembly 60 provides a means of vacuum attachment to a subjacent flat surface 110 via a large suction cup 80 which spans the bottom surface of the housing 62 of the base assembly 60. A perimeter of the section cup 80 is affixed to a bottom perimeter of the housing 62. The suction cup 80 is envisioned to be a circular or oval-shaped rubber cup, capable of producing a vacuum upon the flat surface 110 by rotating an actuator handle 82 located along a side surface of the housing 62. The actuator handle 62 includes an integral actuator rod portion 84 which extends horizontally through the housing 62 and engages an eyelet portion 86 being centered upon a top surface of the suction cup 80. The actuator rod 84 provides a crankshaft function to lift a center portion of the suction cup 80 when rotated, thereby producing an internal vacuum as the external actuator handle portion 82 is rotated.

The bowl portion 20 of the apparatus 10 is envisioned to include an integrally-molded curb feature 22 which protrudes perpendicularly from an inner surface, extending partially along a top edge of the bowl 20. The curb feature 22 helps to contain the pet food 100 within the bowl 20 during feeding. Additionally, the bowl 20 is envisioned to include a plurality of molded-in and/or painted graduations 30 positioned along an inner surface to aid a user in providing a specific volume of pet food 100 to the pet. The graduations 30 are envisioned to designate a number of cups of pet food 100, or other equivalent volumetric indicia. The bowl 20 and base assembly 60 are envisioned being introduced in different sizes such as small, medium, and large, which correspond to differently sized pets. The bowl 20 and base assembly 60 are envisioned to be made of a machine-washable plastic material and manufactured in an injection molding process. Furthermore, the bowl 20 and base assembly 60 are to be introduced in a variety of attractive colors and patterns based upon a user's preferences.

Referring now to FIGS. 3a and 3b, exploded and sectional views of the latching features 24, 68 of the apparatus 10, according to the preferred embodiment of the present invention, are disclosed. The bowl 20 is removably attached to the base assembly 60 via respective interlocking male latching feature 24 and female latching feature 68 portions. An embodiment of the latching features 24, 68 is shown here utilizing correspondingly shaped and interlocking features including a cross-sectional "T"-shaped male latching feature 24 and corresponding "L"-shaped finger portions 70 of the female latching feature 68, thereby providing sliding engagement into each other. The engagement may be made permanent by means of an adhesive or fasteners such as screws or nuts and bolts. However, it is understood that the attachment method is not limited to the illustrated embodiment, and may be accomplished equally well using other designs and methods, and as such should not be interpreted as a limiting factor of the apparatus 10. It is further envisioned that the latching features 24, 68 would provide a means to retain their engaged positions via methods such as, but not limited to: a friction fit, molded-in interfering features, or the like.

It is envisioned that other styles and configurations of the present invention can be easily incorporated into the teachings of the present invention, and only one particular configuration shall be shown and described for purposes of clarity and disclosure and not by way of limitation of scope.

Figure 1:
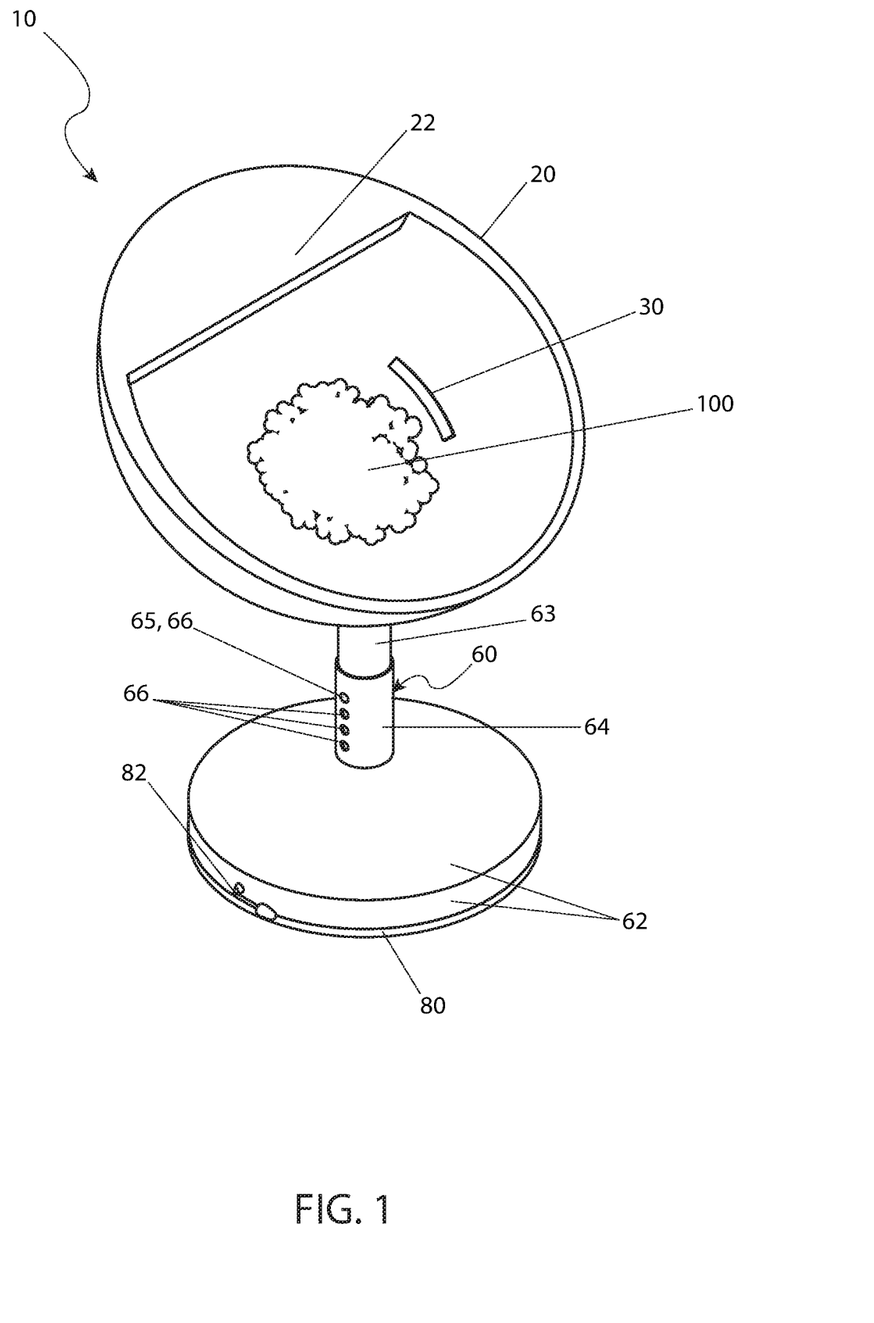
FIG. 1 is a perspective view of a specialized pet food bowl 10, according to a preferred embodiment of the present invention.
Figure 2:
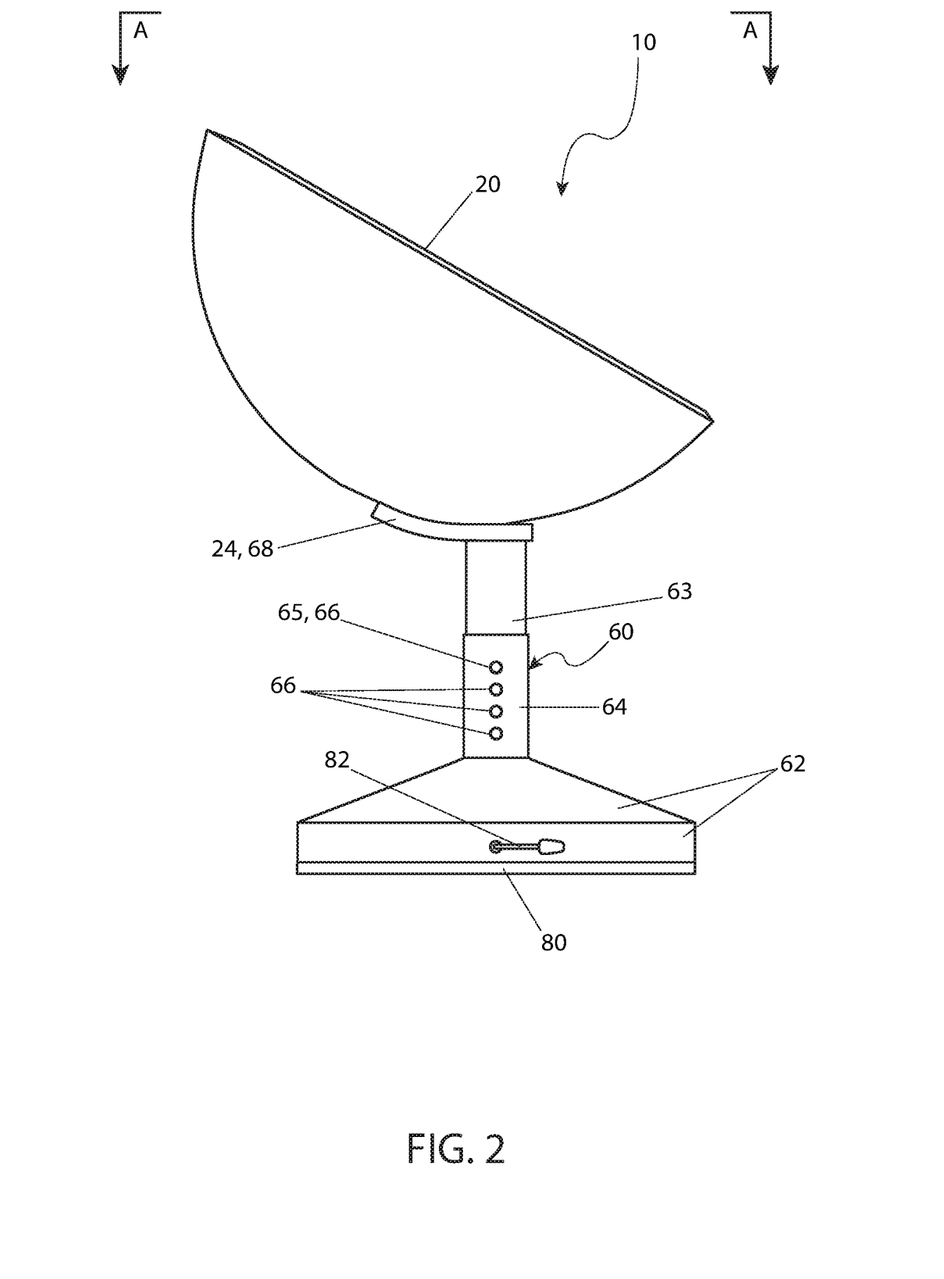
FIG. 2 is a right side elevation view of a specialized pet food bowl 10, according to a preferred embodiment of the present invention.
Figure 3:
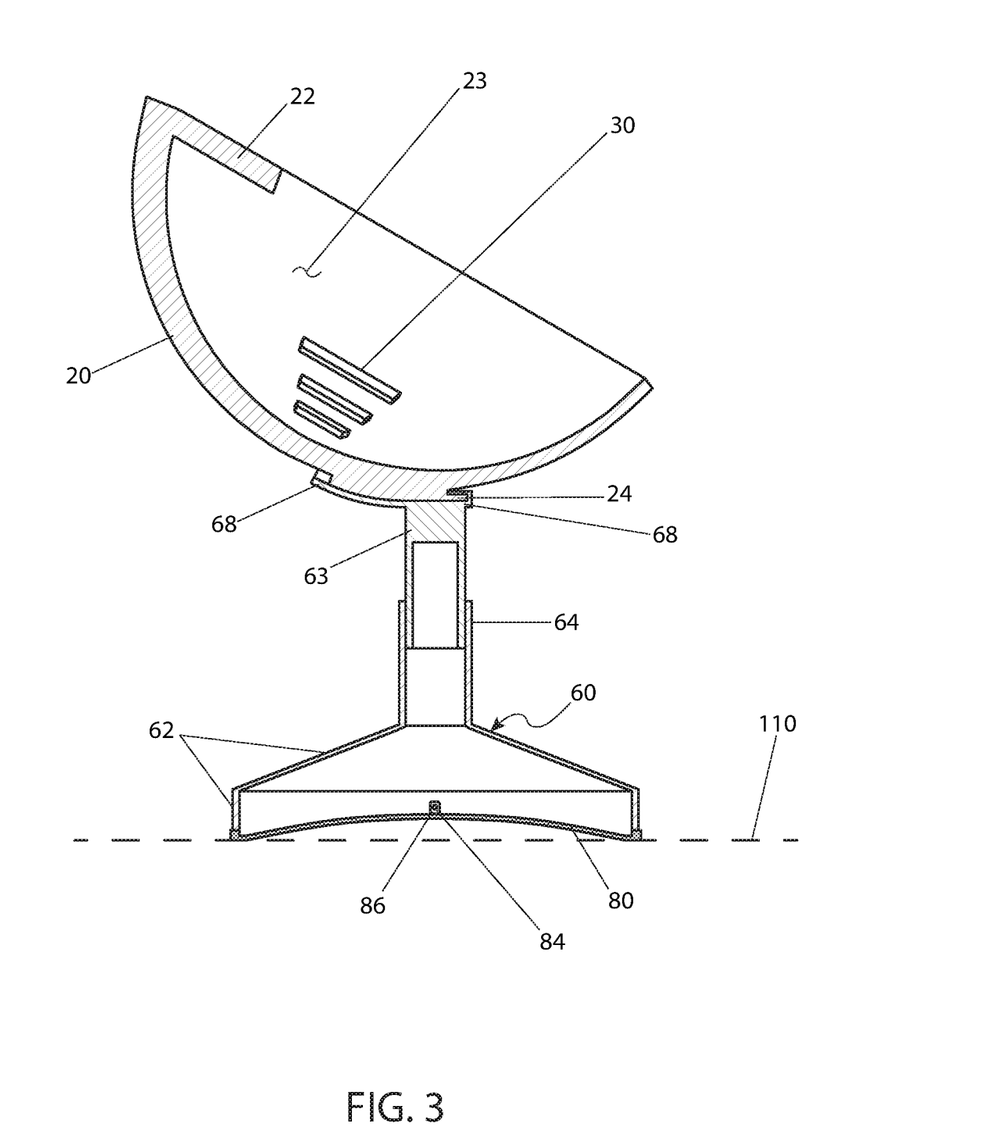
FIG. 3 is a sectional view of the specialized pet food bowl 10 taken along section line A-A (see FIG. 2), according to a preferred embodiment of the present invention.
Figure 4:
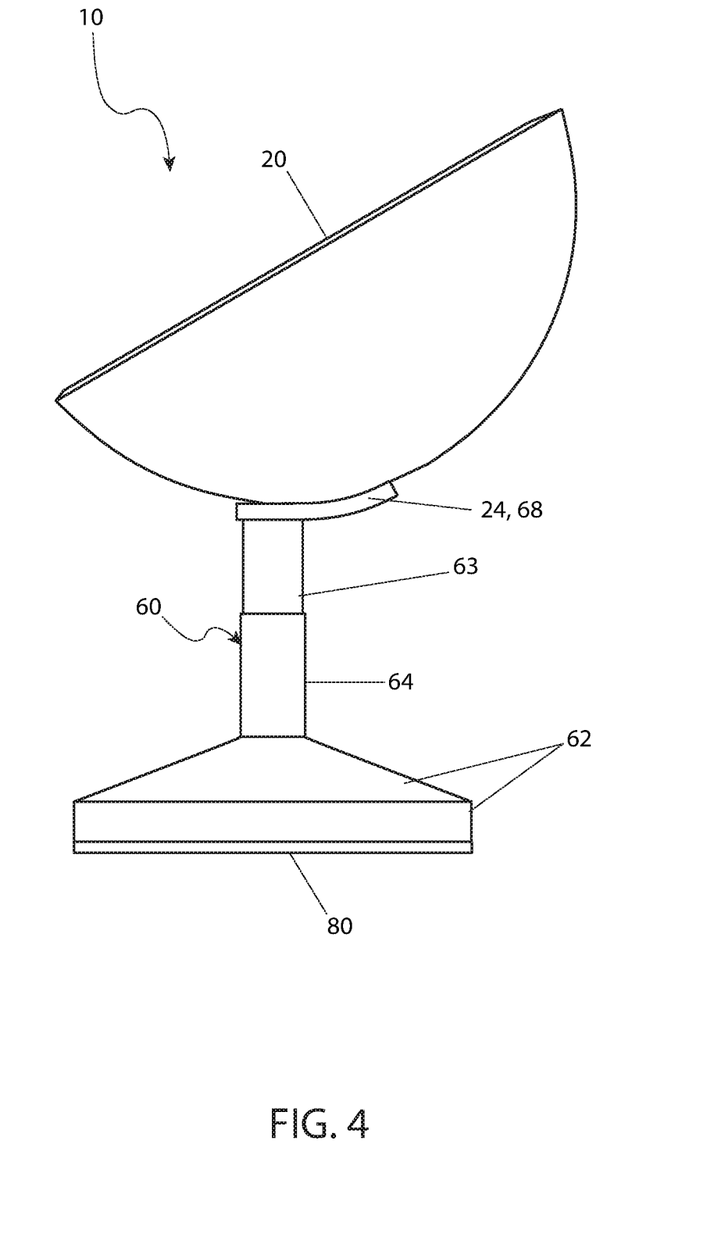
FIG. 4 is a left side elevation view of a specialized pet food bowl 10, according to a preferred embodiment of the present invention.
Figure 5:
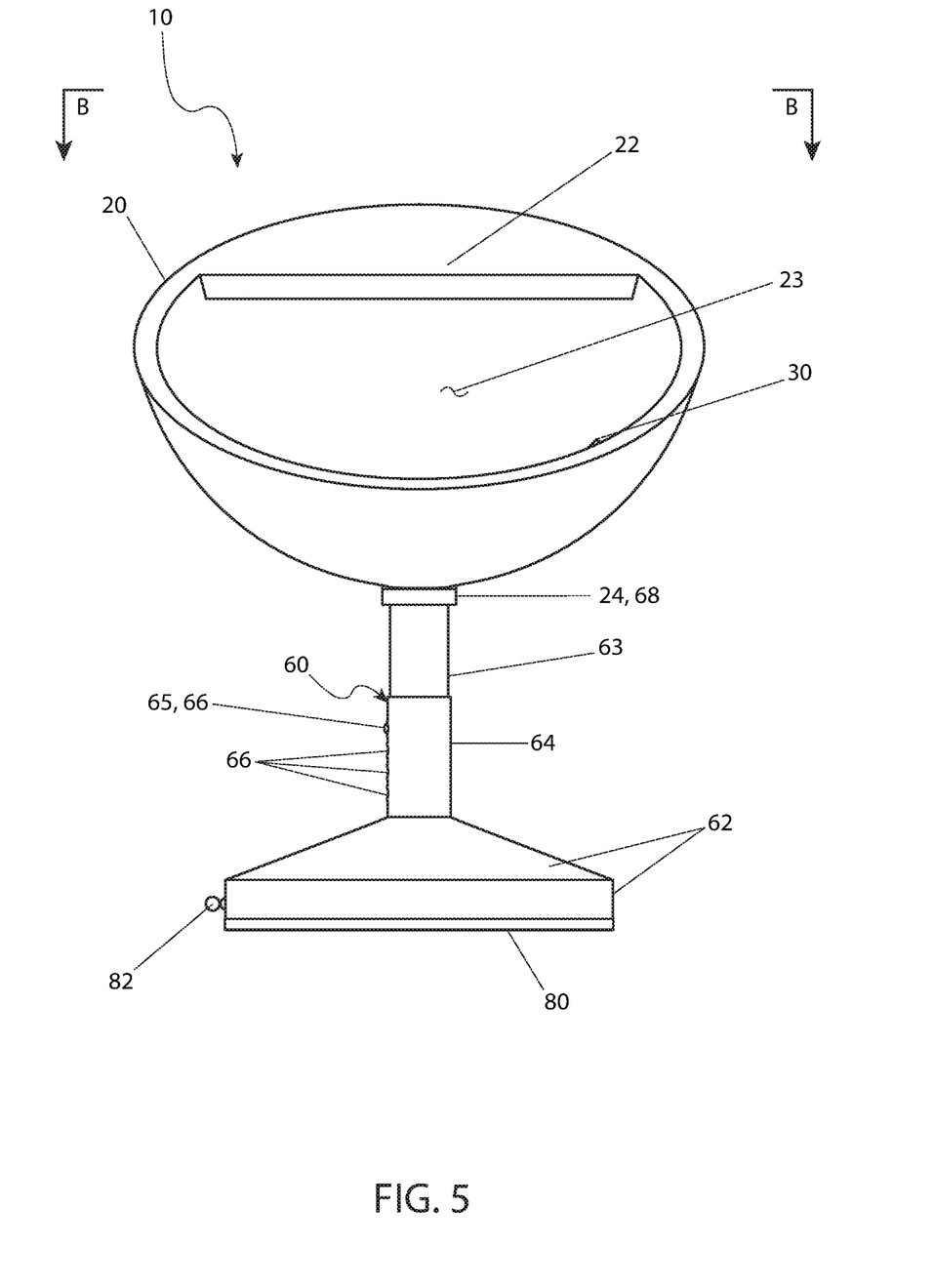
FIG. 5 is a front side elevation view of a specialized pet food bowl 10, according to a preferred embodiment of the present invention.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: procuring a model of the apparatus 10 having a desired size and preferred color; securing the base assembly 60 to a flat surface 110 by rotating the actuator handle 82 until a vacuum is generated within the suction cup 80; attaching the bowl 20 to the post 63 by slidingly engaging the finger portions 70 of the female latching feature 68 onto the male latching feature 24 until fully seated; inserting the post 63 into the receiver tube 64 until obtaining a desired height of the bowl 20 off the flat surface 110; retaining the height of the bowl 20 by allowing the spring pin 65 to protrude outwardly through an aligned aperture portion 66 of the receiver tube 64; dispensing a volume of pet food 100 into the bowl 20 as indicated by the volumetric graduations 30 within the bowl 20; allowing the pet to eat the pet food 100; and, meeting the special feeding needs of pets having special physical needs and limitations, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A pet feeding apparatus, comprising:
  a bowl comprising:
    an integrally molded first latching feature located on an exterior bottom side thereof;
    an integrally-molded curb feature which protrudes perpendicularly from an inner surface and extending partially along a top edge thereof; and,
    a plurality of graduations positioned along said inner surface;
  a post protruding downward from an integrally molded second latching feature;
  a housing having a receiving tube upwardly projecting from a center therefrom; and,
  a height adjustment means for removably attaching and vertically adjusting said bowl relative to said housing;
  wherein said bowl is capable of being secured to said post by connection between said first and second latching feature;
  wherein once said bowl is removably secured to said post, said post may be removably positioned within said receiving tube;
  wherein said housing is capable of being secured to a horizontal surface; and,
  wherein said bowl is capable of being positioning at an angle relative to a vertical center axis of said height adjusting means.

2. The apparatus of claim 1, wherein said graduations are volumetric indicia.

3. The apparatus of claim 1, further comprising:
  a suction cup having a perimeter affixed to a bottom perimeter of said housing;
  an actuator handle located on a side surface of said housing and in mechanical communication with an actuator rod passing through said side surface; and,
  an eyelet secured to a center portion of said suction cup and in mechanical communication with said actuator rod;
  wherein actuation of said actuator handle in turn actuates said actuator rod, thereby lifting or lowering said suction cup, thereby producing or breaking an internal vacuum against a horizontal surface.

4. The apparatus of claim 1, wherein said height adjustment means comprises a spring pin located on said post and plurality of apertures located on said receiver tube;
  wherein said spring pin correspondingly secures within an individually aligned aperture.

5. The apparatus of claim 1, wherein said first latching feature is "T"-shaped and said second latching feature has a pair of corresponding "L"-shaped fingers thereby providing sliding engagement into each other.

6. The apparatus of claim 5, wherein said first latching feature is further positioned in an off-center location relative to a center axis of said bowl, thereby presenting said bowl in a tilted state.

7. The apparatus of claim 1, wherein said bowl and said housing comprise an injection molded machine-washable plastic.

8. A pet feeding apparatus, comprising:
  a bowl comprising:
    an integrally molded first latching feature located on an exterior bottom side thereof;
    an integrally-molded curb feature which protrudes perpendicularly from an inner surface and extending partially along a top edge thereof; and,
    a plurality of graduations positioned along said inner surface;
  a post protruding downward from an integrally molded second latching feature;
  a housing having a receiving tube upwardly projecting from a center therefrom; and, a height adjustment means for removably attaching and vertically adjusting said bowl relative to said housing;

wherein said bowl is capable of being removably secured to said post by connection between said first and second latching feature;

wherein once said bowl is removably secured to said post, said post may be removably positioned within said receiving tube;

wherein said housing is capable of being secured to a horizontal surface; and, wherein said bowl is capable of being positioning at an angle relative to a vertical center axis of said height adjusting means.

9. The apparatus of claim 8, wherein said graduations are volumetric indicia.

10. The apparatus of claim 8, further comprising:

a suction cup having a perimeter affixed to a bottom perimeter of said housing;

an actuator handle located on a side surface of said housing and in mechanical communication with an actuator rod passing through said side surface; and, an eyelet secured to a center portion of said suction cup and in mechanical communication with said actuator rod;

wherein actuation of said actuator handle in turn actuates said actuator rod, thereby lifting or lowering said suction cup, thereby producing or breaking an internal vacuum against a horizontal surface.

11. The apparatus of claim 8, wherein said height adjustment means comprises a spring pin located on said post and plurality of apertures located on said receiver tube;

wherein said spring pin correspondingly secures within an individually aligned aperture.

12. The apparatus of claim 8, wherein said first latching feature is "T"-shaped and said second latching feature has a pair of corresponding "L"-shaped fingers thereby providing sliding engagement into each other.

13. The apparatus of claim 12, wherein said first latching feature is further positioned in an off-center location relative to a center axis of said bowl, thereby presenting said bowl in a tilted state.

14. The apparatus of claim 8, wherein said bowl and said housing comprise an injection molded machine-washable plastic.

* * * * *